United States Patent [19]

Strnad

[11] 4,133,661
[45] Jan. 9, 1979

[54] AIR FILTER ASSEMBLY
[75] Inventor: Ronald L. Strnad, Grand Blanc, Mich.
[73] Assignee: General Motors Corporation, Detroit, Mich.
[21] Appl. No.: 854,658
[22] Filed: Nov. 25, 1977
[51] Int. Cl.² .............................................. B01D 46/52
[52] U.S. Cl. ........................................ 55/497; 55/500; 55/501; 55/503; 55/511; 55/521
[58] Field of Search .............. 55/497, 499, 500, 501, 55/503, 511, 521; 210/493 R

[56] References Cited
U.S. PATENT DOCUMENTS

| 2,135,863 | 11/1938 | Walker | 55/499 |
| 3,693,410 | 9/1972 | Robrecht et al. | 55/511 X |
| 3,712,033 | 1/1973 | Gronholz | 55/497 X |
| 3,815,754 | 6/1974 | Rosenberg | 55/497 X |

FOREIGN PATENT DOCUMENTS

| 681811 | 10/1939 | Fed. Rep. of Germany | 55/498 |
| 932849 | 4/1948 | France | 210/493 |

Primary Examiner—Frank W. Lutter
Assistant Examiner—Kathleen J. Prunner
Attorney, Agent, or Firm—John P. Moran

[57] ABSTRACT

The drawings illustrate an air filter assembly which is assembled from a pair of identical box-like housing halves. Equally spaced rib elements are formed in each half such that, upon assembly, the rib elements are interdigitated to provide a space for confining therebetween a pleated filtering sheet having a large filtering area.

3 Claims, 4 Drawing Figures

AIR FILTER ASSEMBLY

This invention relates generally to air filter assemblies and, more particularly, to remote mounted, non-circular, box-like types of air filter assemblies.

It is advantageous for lower hood height to be able to mount the air filter assembly remotely from the carburetor in a compact space, and for such an assembly to incorporate as large a sealed filtering area as possible. It is also desirable that the assembly be readily manufacturable.

Accordingly, a general object of the invention is to provide an improved air filter assembly having the above features.

Another object of the invention is to provide an improved air filter assembly which is assembled from identical first and second, box-like housing halves, and includes interdigitated equally spaced rib elements confining a laterally pleated filtering sheet therebetween.

A further object of the invention is to provide a filtering unit including oppositely disposed first and second identical housing halves, each of the housing halves having a flat mating surface formed along the top of each of the side and end walls thereof, an opening formed in one end wall providing means for communicating air therethrough, and a set of equally spaced rib segments formed adjacent the inner surface of each side wall of each housing half and extending beyond the flat mating surface, the rib segments being adapted to provide a predetermined width space between adjacent interdigitated rib segments for confining a pleated filtering sheet therebetween when the flat mating surfaces of the two housing halves are mounted in an abutting relationship with the openings positioned at opposite ends.

These and other objects and advantages will become more apparent when reference is made to the following description and accompanying drawings, wherein.

Figure 1:
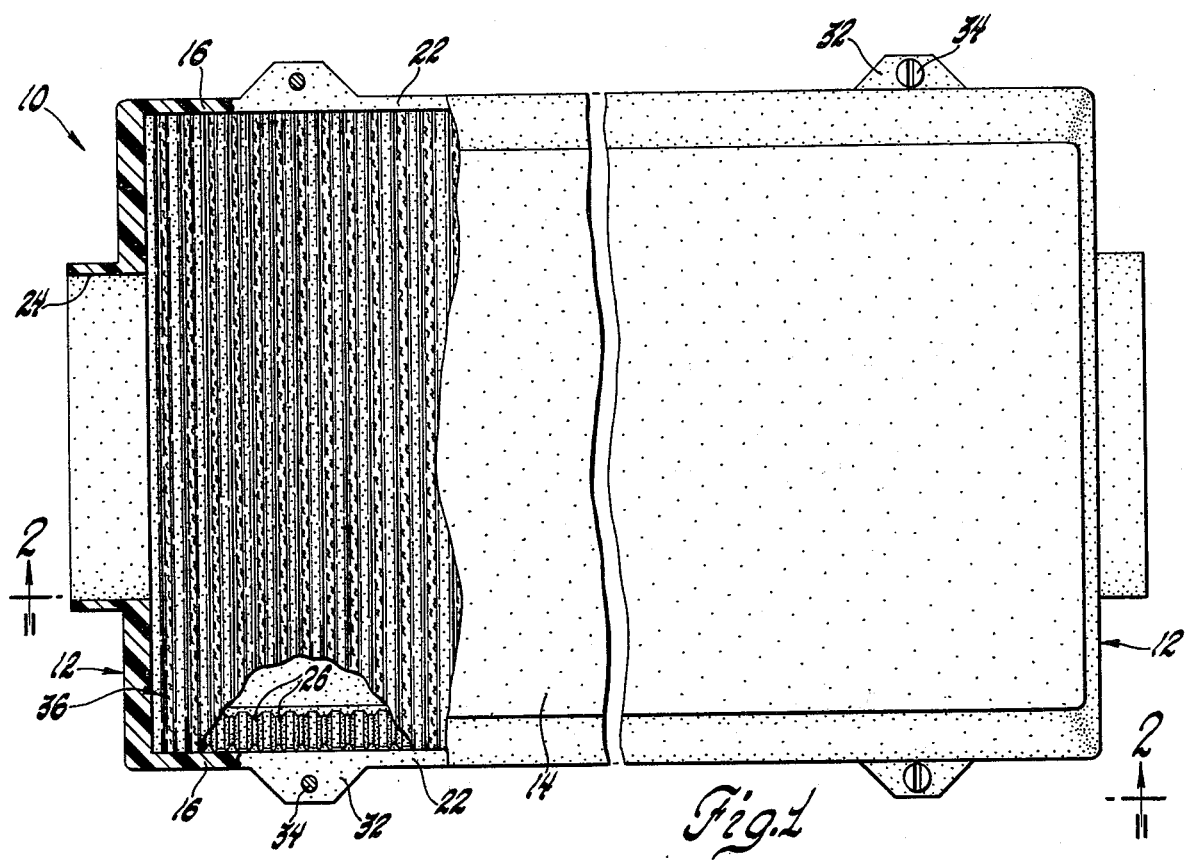
FIG. 1 is a fragmentary plan view of the inventive air filter assembly.
Figure 2:
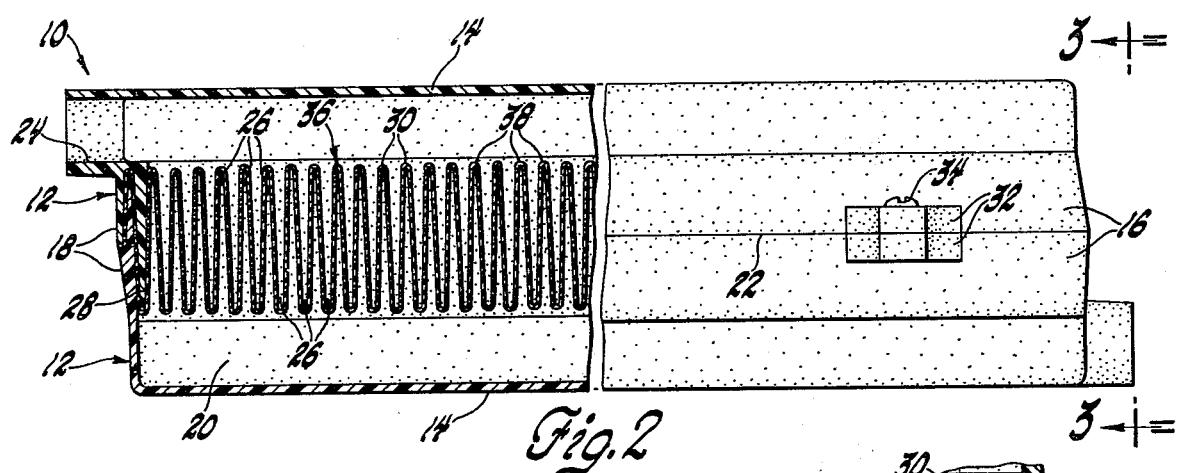
FIG. 2 is a fragmentary cross-sectional view taken along the plane of the line 2—2 of FIG. 1, and looking in the direction of the arrows.
Figures 3, 4:
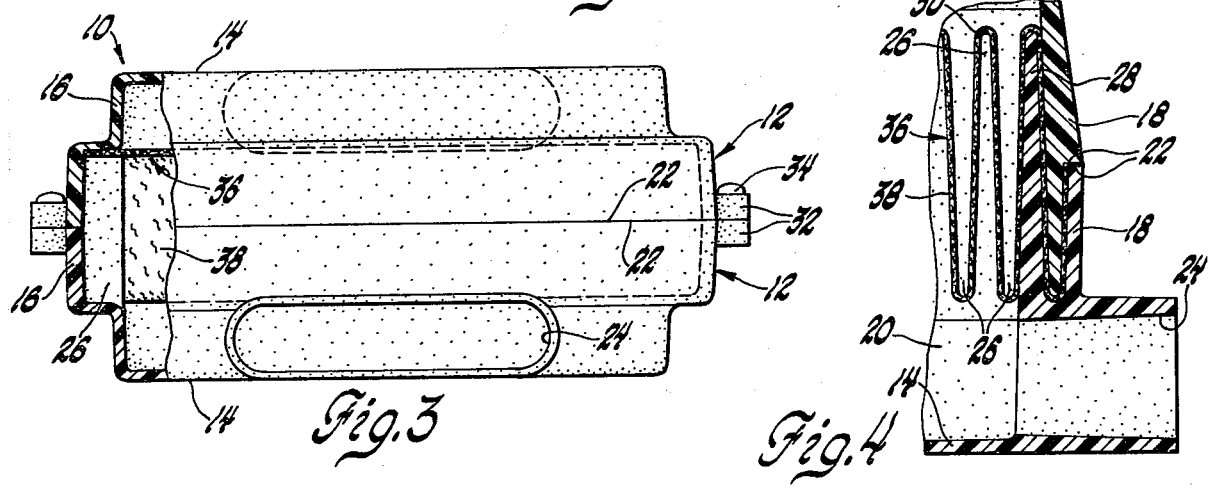
FIG. 3 is an end view taken along the plane of the line 3—3 of FIG. 2, and looking in the direction of the arrows.
FIG. 4 is an enlarged, fragmentary cross-sectional view of a portion of the FIG. 3 structure.

Referring now to the drawings in greater detail, the figures illustrate a filtering unit 10 having oppositely disposed first and second identical housing halves 12. Each housing half 12 includes a bottom wall 14 and oppositely disposed side 16 and end 18 walls forming a chamber 20 therewithin. A flat mating surface 22 is formed along the top of each of the side and end walls, and an opening 24 is formed in one end wall 18 providing means for communicating air therethrough between the interior and the exterior of the chamber 20 via suitable ducting (not shown).

A set of equally spaced rib segments 26 is formed adjacent the inner surface of each side wall 16 of each housing half 12 so as to extend out of the chamber 20 a predetermined distance beyond the flat mating surface 22. An end rib 28, corresponding in cross-section to the rib segments 26, extends laterally across one end of each housing half 12, spaced from the adjacent end wall 18.

The rib segments 26 and end ribs 28 are adapted to provide a predetermined width space 30 between adjacent interdigitated rib segments and end ribs when the flat mating surfaces 22 of the first and second housing halves 12 are mounted in an abutting relationship with the openings 24 positioned at opposite ends thereof. Suitable fastening means, such as integral flanges 32 and bolts 34 are incorporated on the exterior of each housing half 12 for fastening abutted halves together.

A filtering sheet 36 is formed into a series of uniformly spaced pleats 38 and confined in the space 30 between oppositely disposed sets of interdigitated rib segments 26 and end ribs 28, without the need for using sealing means, such as urethanes or plastisols on any end or edge surfaces thereof.

It should be apparent the invention provides an improved, compact, and efficient air filter assembly which is readily manufacturable from identical halves and which may be remotely mounted in the engine compartment, while subjecting the entering air to a large filtering area. Furthermore, replacement filtering elements may be stored in a much smaller space than is the case for cylindrical filtering elements.

While but one embodiment has been shown and described, other modifications thereof are possible.

What is claimed is:

1. A filtering unit comprising oppositely disposed first and second housing halves, each of said housing halves including a bottom wall and oppositely disposed side and end walls forming a chamber therewithin, a flat mating surface formed along the top of each of said side and end walls, an opening formed in one end wall providing means for communicating air therethrough between the interior and the exterior of said chamber, a set of equally spaced rib segments formed adjacent the inner surface of each side wall, said rib segments extending out of said chamber a predetermined distance beyond said flat mating surface, and an end rib corresponding in cross-section to said rib segments extending laterally across one end and spaced from the adjacent end wall; said rib segments and end ribs being adapted to provide a predetermined width space between adjacent interdigitated rib segments and end ribs when said flat mating surfaces of said first and second housing halves are mounted in an abutting relationship with said openings positioned at opposite ends; a filtering sheet having a series of pleats formed thereacross confined in said space between oppositely disposed sets of interdigitated rib segments and end ribs; and means formed on the exterior of each housing half for fastening the abutted halves together.

2. A filtering unit comprising oppositely disposed first and second housing halves, each of said housing halves including a bottom wall and oppositely disposed side and end walls forming a chamber therewithin, and a flat mating surface formed along the top of each of said side and end walls for assemblying said first and second housing halves in an abutting relationship; an opening formed in one of said end walls of each of said first and second housing halves for communicating air therethrough between the interior and the exterior of said chambers, said one end walls being oppositely disposed from one another; a set of equally spaced rib segments formed adjacent the inner surface of each side wall of each of said first and second housing halves, said rib segments extending out of each of said chambers a predetermined distance beyond said flat mating surfaces; an end rib corresponding in cross-section to said rib segments extending laterally across one end of each of said first and second housing halves spaced from the adjacent end wall; a predetermined width space formed between adjacent interdigitated rib segments and end ribs; a filtering sheet having a series of uniformly spaced pleats formed thereacross mounted in said space between oppositely disposed sets of interdigitated rib segments and end ribs; and means formed on the exterior of each housing half for fastening said first and second housing halves together.

3. A filtering unit comprising oppositely disposed first and second identical housing halves, each of said housing halves including a bottom wall and oppositely disposed side and end walls forming a chamber therewithin, a flat mating surface formed along the top of each of said side and end walls, an opening formed in one end wall providing means for communicating air therethrough between the interior and the exterior of said chamber; a set of equally spaced rib segments formed adjacent the inner surface of each side wall of each housing half, said rib segments extending out of each of said chambers a predetermined distance beyond said flat mating surfaces, and an end rib corresponding in cross-section to said rib segments extending laterally across one end of each housing half spaced from the adjacent end wall, said rib segments and end ribs being adapted to provide a predetermined width space between adjacent interdigitated rib segments and end ribs when said flat mating surfaces of said first and second housing halves are mounted in an abutting relationship with said openings positioned at opposite ends; a filtering sheet having a series of uniformly spaced pleats formed thereacross confined in said space between oppositely disposed sets of interdigitated rib segments and end ribs; and means formed on the exterior of each housing half for fastening abutted halves together.

* * * * *